US012743259B2

(12) United States Patent
Lo et al.

(10) Patent No.: US 12,743,259 B2
(45) Date of Patent: Sep. 22, 2026

(54) METHOD FOR GROUP RELATIVE POLICY OPTIMIZATION REINFORCEMENT LEARNING ON STRUCTURED DATA FOR CODE GENERATION

(71) Applicant: Broadridge Financial Solutions, Inc., Newark, NJ (US)

(72) Inventors: Joseph Lo, Newark, NJ (US); German Soto Sanchez, Newark, NJ (US); Vijay Mayadas, Newark, NJ (US); Richard Chern, Newark, NJ (US)

(73) Assignee: Broadridge Financial Solutions, Inc., Newark, NJ (US)

( * ) Notice: Subject to any disclaimer, the term of this patent is extended or adjusted under 35 U.S.C. 154(b) by 0 days.

(21) Appl. No.: 19/532,268

(22) Filed: Feb. 6, 2026

(65) Prior Publication Data

US 2026/0227970 A1 Aug. 6, 2026

Related U.S. Application Data

(60) Provisional application No. 63/754,962, filed on Feb. 6, 2025.

(51) Int. Cl.
*G06F 8/35* (2018.01)
*G06N 20/00* (2019.01)

(52) U.S. Cl.
CPC ............... *G06F 8/35* (2013.01); *G06N 20/00* (2019.01)

(58) Field of Classification Search
None
See application file for complete search history.

(56) References Cited

U.S. PATENT DOCUMENTS 10,331,659 B2 * 6/2019 Ahuja ................... G06F 16/285
11,726,750 B1 8/2023 Arcadinho et al.
12,222,898 B1 * 2/2025 Madan .................. G06F 16/148
12,614,026 B1 4/2026 Leonard et al.
2020/0293562 A1 * 9/2020 Pasternack ........... G06F 16/338
2023/0092969 A1 3/2023 Chen et al.
(Continued)

FOREIGN PATENT DOCUMENTS

KR 102895547 B1 * 12/2025 ............. G06F 40/35

OTHER PUBLICATIONS

International Search Report and Written Opinion from International Application No. PCT/US2026/014288 dated May 15, 2026.

*Primary Examiner* — Andrew M. Lyons
(74) *Attorney, Agent, or Firm* — GREENBERG TRAURIG, LLP

(57) ABSTRACT

In some embodiments, the present disclosure provides an exemplary method that may include steps of integrating received structured data and received unstructured data from at least one enterprise system for a plurality of data outputs; generating one or more smart prompts; retrieving documentation relevant to a particular workflow and appending the particular workflow to the one or more smart prompts; utilizing a large language model to produce a plurality of candidate outputs; scoring each candidate output of the plurality of candidate outputs; calculating an average score across the plurality of candidate outputs; selecting at least one candidate output; and updating a plurality of parameters associated with a large language model based on the at least one selected candidate output.

20 Claims, 8 Drawing Sheets

(56) References Cited

U.S. PATENT DOCUMENTS

| | | | | |
|---|---|---|---|---|
| 2024/0062120 | A1* | 2/2024 | He | G06N 20/20 |
| 2024/0086767 | A1* | 3/2024 | Xu | G06N 7/01 |
| 2024/0095584 | A1* | 3/2024 | Xu | G06N 20/00 |
| 2024/0202221 | A1 | 6/2024 | Juban et al. | |
| 2024/0345551 | A1 | 10/2024 | Selvaraj et al. | |
| 2024/0394545 | A1* | 11/2024 | Eisenschlos | G06F 9/453 |
| 2025/0021650 | A1* | 1/2025 | Corlatescu | G06F 16/335 |
| 2025/0094473 | A1* | 3/2025 | Wilczynski | G06F 16/345 |
| 2025/0117417 | A1* | 4/2025 | Aghajanyan | G06F 16/3344 |
| 2025/0131028 | A1* | 4/2025 | Siebel | G06N 3/092 |
| 2025/0131044 | A1* | 4/2025 | Ken-Kwofie | G06F 16/9038 |
| 2025/0181619 | A1* | 6/2025 | Jain | G06F 16/383 |
| 2025/0188823 | A1* | 6/2025 | Rathore | E21B 43/16 |
| 2025/0245665 | A1* | 7/2025 | Tholar | G06Q 20/4016 |
| 2025/0252445 | A1* | 8/2025 | Gaddam | H04L 51/02 |
| 2025/0315683 | A1* | 10/2025 | Feehan | G06N 5/04 |
| 2025/0348728 | A1* | 11/2025 | Bang | G06N 3/006 |
| 2025/0356187 | A1* | 11/2025 | Papancea | G06N 3/08 |
| 2025/0372219 | A1* | 12/2025 | Boussina | G16H 10/60 |
| 2026/0064731 | A1* | 3/2026 | Rezaeian | G06F 16/3325 |
| 2026/0087010 | A1* | 3/2026 | Agarwal | G06F 16/24542 |

* cited by examiner

METHOD FOR GROUP RELATIVE POLICY OPTIMIZATION REINFORCEMENT LEARNING ON STRUCTURED DATA FOR CODE GENERATION

FIELD OF TECHNOLOGY

The present disclosure generally relates to a method for group relative policy optimization reinforcement learning on structured data for code generation.

BACKGROUND OF TECHNOLOGY

Typically, legacy systems within enterprises operate multiple core platforms, often mainframes, that handle millions of records daily. The volume of these daily records may lead to incomplete documentation, and domain knowledge is often locked in proprietary code or in minds of a small number of experts. This limited documentation and access to knowledge increases risk, as standard code-generation tools do not leverage the wealth of logs that come from actual production runs.

SUMMARY OF DESCRIBED SUBJECT MATTER

In some embodiments, the present disclosure provides an exemplary technically improved computer-based method that includes at least the following steps: integrating received structured data and received unstructured data from at least one enterprise system for a plurality of data outputs; generating one or more smart prompts based on an alignment of one or more data outputs of the plurality of data outputs; retrieving documentation relevant to a particular workflow and appending the particular workflow to the one or more smart prompts; utilizing a large language model to produce a plurality of candidate outputs based on the one or more smart prompts; scoring each candidate output of the plurality of candidate outputs using a language model scoring function and at least one domain-specific scoring function, where the domain-specific scoring function provides additional weighted values to one or more candidate outputs; calculating an average score across the plurality of candidate outputs; selecting at least one candidate output that exceed a predetermined threshold, the predetermined threshold associated with the average score across the plurality of candidate outputs; and updating a plurality of parameters associated with a large language model based on the at least one selected candidate output.

In some embodiments, a non-transitory computer-readable storage medium tangibly encoded with computer-executable instructions, that when executed by a device, perform a method including: integrating received structured data and received unstructured data from at least one enterprise system for a plurality of data outputs; generating one or more smart prompts based on an alignment of one or more data outputs of the plurality of data outputs; retrieving documentation relevant to a particular workflow and appending the particular workflow to the one or more smart prompts; utilizing a large language model to produce a plurality of candidate outputs based on the one or more smart prompts; scoring each candidate output of the plurality of candidate outputs using a language model scoring function and at least one domain-specific scoring function, where the domain-specific scoring function provides additional weighted values to one or more candidate outputs; calculating an average score across the plurality of candidate outputs; selecting at least one candidate output that exceed a predetermined threshold, the predetermined threshold associated with the average score across the plurality of candidate outputs; and updating a plurality of parameters associated with a large language model based on the at least one selected candidate output.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
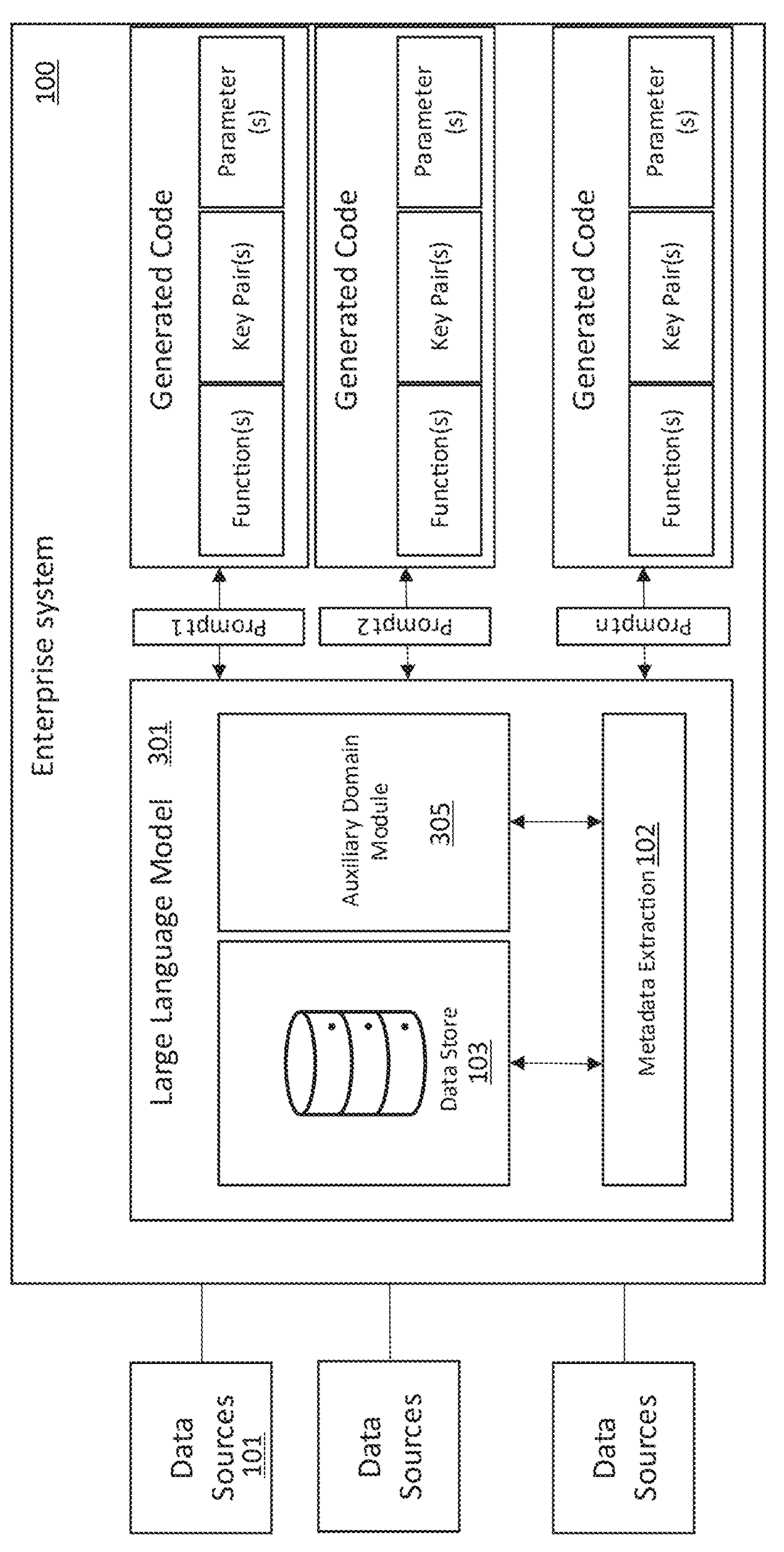
FIG. 1 depicts a schematic of one or more ingestion layers detailing both structured data and unstructured data collected from a mainframe environment, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases “in one embodiment” and “in some embodiments” as used herein do not necessarily refer to the same embodiment(s), though it may. Furthermore, the phrases “in another embodiment” and “in some other embodiments” as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

At least some embodiments of the present disclosure provide technological solution(s) to at least one technological computer-centered problem associated with handling millions of records daily across multiple core platforms. An illustrative technological computer-centered problem associated with handling millions of records daily across multiple core platforms typically results in incomplete documentation and inaccessible domain knowledge. The problem further arises when these migrating the multiple core platforms or performing major enhancements to the multiple core platforms, as this further increases risk based on the multiple core platforms fails to leverage a plurality of data (i.e., collection of data logs) that come from actual production runs. Moreover, this failure to leverage the plurality of data may rely on common large language model-based code assistant algorithms and common conventional reinforcement learning in natural language processing algorithms. For example, leveraging the plurality of data may rely on publicly available text corpora and may not incorporate real-time processing logs. However, end users may desire and/or need to interact with multiple core platforms that involve preference modeling and/or single-policy optimization, rather than group-level, relative scoring with domain insights. Thus, an end user would need to interface with each software application separately and individually using the software application-specific infrastructure.

As detailed in at least some embodiments herein, at least one technological computer-centered solution associated with the illustrative technological computer-centered problem may include introducing a multi-step integration approach combining structured data outputs and unstructured data outputs in addition with one or more auxiliary domain-specific scoring algorithms. In some embodiments, the present disclosure may receive structured financial transaction data and associated unstructured data logs from at least one mainframe system, where the at least one mainframe system may refer to an enterprise system. In some embodiments, the present disclosure may generate one or more chain-of-thought prompts by aligning transaction data outputs associated with the data logs responsible for producing the data outputs, where the one or more chain-of-though prompts may refer to a smart prompt. In some embodiments, the present disclosure may retrieve documentation relevant to a financial calculation or workflow and appending the calculation to the smart prompts. In some embodiments, the present disclosure may produce multiple candidate outputs with a large language model scoring function and at least one domain-specific scoring function associated with a trained large language model, where the large language model is trained using group relative policy optimization. In some embodiments, the present disclosure may calculate an average score associated with the candidate outputs. In some embodiments, the present disclosure may select one or more candidate outputs that meet and/or exceed a predetermined threshold, where the predetermined threshold has a direct correlation with the calculated average score. In some embodiments, the present disclosure may update a plurality of parameters associated with the large language model based on the selected candidate outputs. In some embodiments, the present disclosure may utilize auxiliary domain-specific scoring algorithm to fine-tune or train a large language model in a continual manner using group relative policy optimization.

FIG. 1 depicts a schematic of one or more ingestion layers detailing both structured data and unstructured data collected from a mainframe environment, in accordance with one or more embodiments of the present disclosure.

In some embodiments, an illustrative enterprise system 100 of the present disclosure may include one or more data sources 101 that include mainframe data files, flat files, streaming event logs, and intermediate databases tables, a meta-data extraction 102, and a structured store 103. In some embodiments, the illustrative enterprise system 100 may harness processing exhaust that may include one or more debug logs, calculation traces, and/or partial results. In some embodiments, the illustrative enterprise system 100 may utilize a parser to identity relevant processing steps and organizes the relevant processing steps into key-value pairs and/or chronological pairs. In some embodiments, the illustrative enterprise system 100 may produce or generate the final outputs (e.g., daily transaction results) may be stored with references to the logs that led to the final outputs. In certain embodiments, the illustrative enterprise system 100 may automatically generate code for one or financial services by utilizing a data ingestion module configured to collect structured and unstructured data from financial systems; a prompt construction engine configured to form chain-of-though prompts linking final outputs to intermediate logs; a retrieval module for appending contextual documentation; a large language model operable to generate candidate outputs; a scoring subsystem operable to compute an average group score; and a reinforcement learning subsystem capable of updating parameters of the large language model based on candidate outputs exceeding the average score.

In some embodiments, the illustrative enterprise system 100 may be receiving structured financial transaction data and associated unstructured data logs from at least one mainframe system; generating one or more smart prompts by aligning a plurality of transaction outputs with received data with the logs responsible of the plurality of transaction outputs; retrieving documentation associated with a financial calculation and/or workflow and appending the documentation to at least one particular smart prompt; generating a plurality of candidate outputs with the large language model; ranking each candidate output using at least one large language model function and at least one domain-specific scoring function; calculating an average score across the plurality of candidate outputs; dynamically selecting one or more candidate output that meets and/or exceeds a predetermined threshold; and automatically updating a plurality of parameters associated with the large language model based on the one or more selected candidate outputs.

In certain embodiments, the scoring of each candidate output can include applying a domain-specific validation algorithm to generate numeric scores quantifying compliance with predetermined domain criteria. In certain embodiments, the illustrative enterprise system 100 can parse identified processing steps to generate the structured data pairs representing temporal and/or logical relationships between the identified processing steps. In certain embodiments, the plurality of smart prompts (i.e., chain-of-thought prompts) may capture internal logic steps by linking partial computational results to one or more final transaction outcomes. In certain embodiments, the illustrative enterprise systems 100 may utilize one or more artificial intelligence algorithms and/or machine learning algorithms to predict the one or more final transactional outcomes. In certain embodiments, the illustrative enterprise systems 100 can store final outputs with associated log references to establish traceability to source data.

In certain embodiments, the illustrative enterprise system 100 may receive real-time streaming data associated with financial events, where newly received data may trigger repeated execution of one or more workflows. In certain embodiments, the domain-specific scoring function may refer to an auxiliary domain module and may be configured to compare one or more candidate outputs against known regulatory constraints and/or historical transaction records. In some embodiments, the enterprise system 100 may communicate with a plurality of models and modules to automatically generate code associated with the plurality of candidate outputs. In certain embodiments, the enterprise system 100 may include a date ingestion module configured to collect structured and unstructured data from one or more financial systems; a prompt construction engine configured to form a chain-of-thought prompts linking final outputs to intermediate logs; a retrieval module capable of appending contextual documentation; a large language model capable of generating a plurality of candidate outputs; a scoring subsystem capable of computing an average group score; and a reinforcement learning subsystem capable of updating a plurality of parameters of the large language model based on the plurality of candidate outputs exceeding a predetermined threshold.

Figure 2:
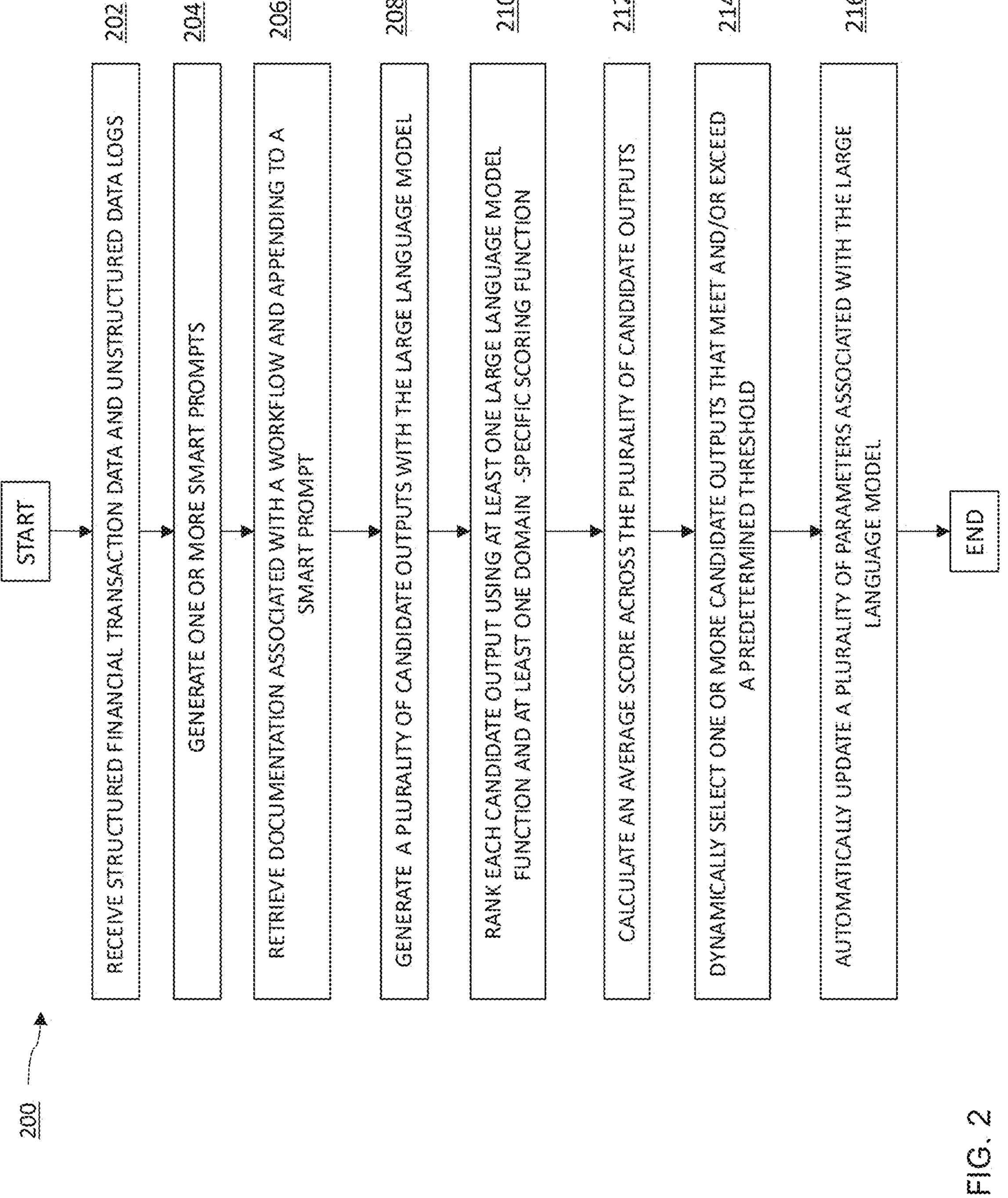
FIG. 2 is a flowchart illustrating operational steps for generating a smart prompt derived from processing exhaust, in accordance with one or more embodiments of the present disclosure.

FIG. 2 is a flowchart 200 illustrating operational steps for generating a smart prompt derived from processing exhaust, in accordance with one or more embodiments of the present disclosure.

In some embodiments, at least one processor of a computing device may perform the following steps, where the steps respectively correlate with 202-216 of FIG. 2. In step 202, one or more modules of the exemplary enterprise system 100 may receive structured financial transaction data and associated unstructured data logs from at least one mainframe system. In step 204, the enterprise system 100 may generate one or more smart prompts by aligning a plurality of transaction outputs with received data with the logs responsible of the plurality of transaction outputs. In step 206, the illustrative enterprise system 100 may retrieve documentation associated with a financial calculation and/or workflow and appending the documentation to at least one particular smart prompt. In step 208, the enterprise system 100 may generate a plurality of candidate outputs with the large language model. In step 210, the enterprise system 100 may rank each candidate output using at least one large language model function and at least one domain-specific scoring function. In step 212, the enterprise system 100 may calculate an average score across the plurality of candidate outputs. In step 214, the enterprise system 100 may dynamically select one or more candidate outputs that meets and/or exceeds a predetermined threshold. In step 216, the enterprise system 100 may automatically update a plurality of parameters associated with the large language model based on the one or more selected candidate outputs.

In some embodiments, the flowchart 200 may be performed by a chain-of-thought construction module 201, where the module may align each final output (or partial result) with the collected data logs and/or calculation trace to form a step-by-step reasoning chain. In some embodiments, the flowchart 200 may be performed by a retrieval-augmented documentation module 203, where the module may utilize a retrieval engine that extracts relevant passages from system manuals, regulatory guidelines, or architectural documentation that are concatenated to the chain-of-thought. In some embodiments, the flowchart 200 may be performed by a prompt formatting module 205, where the module may create question statements and automatically pairs the statements with predicted answers derived from output of the chain-of-thought module 203, where these pairs are used to build and/or refine subsequent smart prompts for the large language model. For example, the prompt formatting module 205 may generate a question statemen, such as "how was the tax deduction calculated" and utilize the other modules within the associated with the enterprise system 100 to generate and predict a plurality of answers from the structured data and the unstructured data logs.

Figure 3:
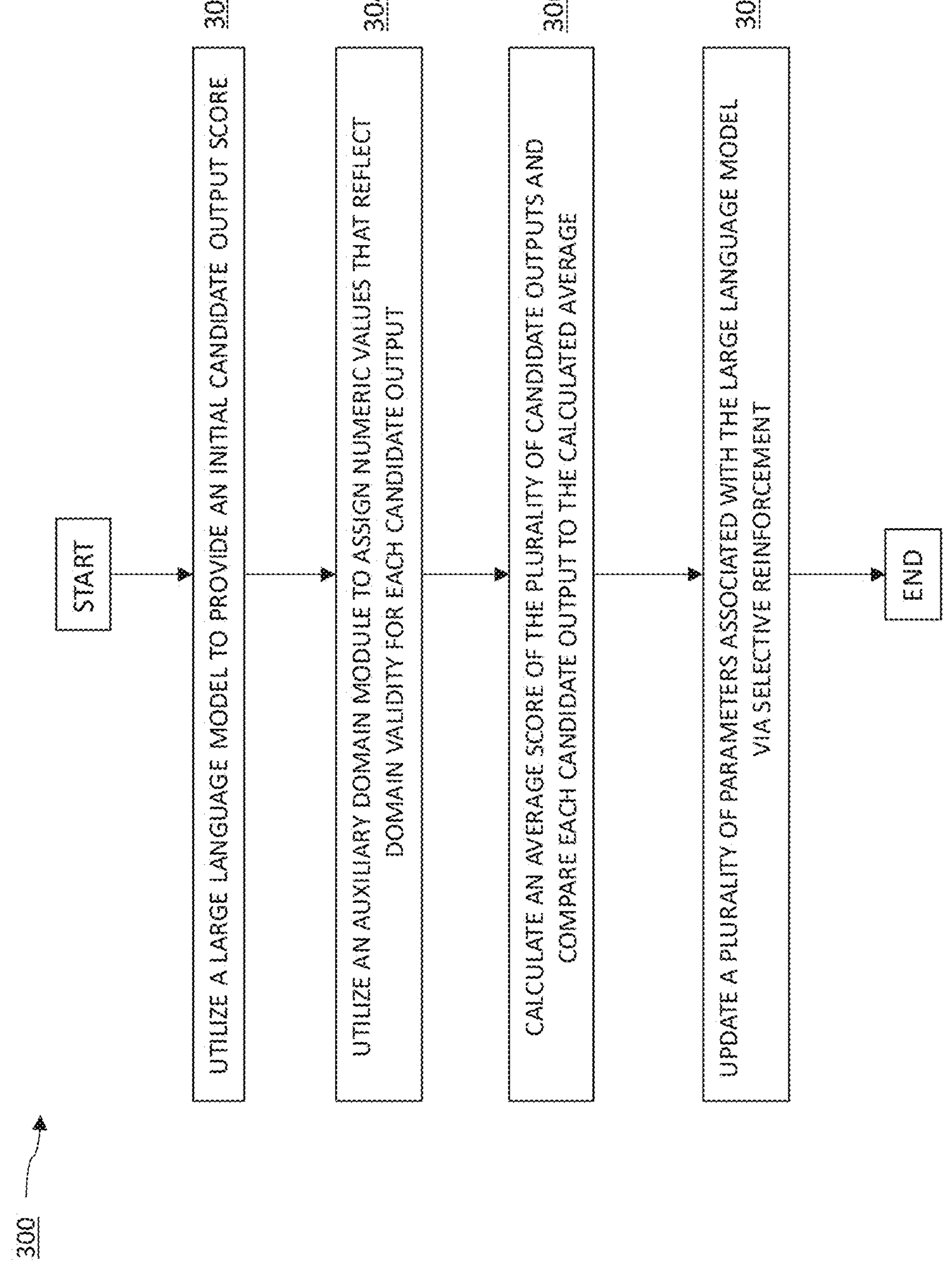
FIG. 3 depicts a flowchart illustrating operational steps for optimizing group relative policy for a plurality of ranked and selected candidate outputs of an enterprise system 100, in accordance with one or more embodiments of the present disclosure.

FIG. 3 depicts a flowchart 300 illustrating operational steps for optimizing group relative policy for a plurality of ranked and selected candidate outputs of an enterprise system 100, in accordance with one or more embodiments of the present disclosure.

In some embodiments, at least one processor of a computing device may perform the following steps, where the steps respectively correlate with 302-308 of FIG. 3. In step 302, one or more modules of the enterprise system 100 may utilize a large language model 301 to provide an initial candidate output score, where the large language model 301 may evaluate each candidate output's coherence, correctness, and/or chain-of-though alignment. In certain embodiments, the large language model 301 may serve as an initial backbone for the optimization of group relative policy for the plurality of ranked and selected candidate outputs. In certain embodiments, a candidate generation module 303 may generate a plurality of plausible responses (i.e., code blocks) that capture different ways to implement inferred logic for each smart prompt. In step 304, the enterprise system 100 may utilize an auxiliary domain module 305 to assign numeric values that reflect domain validity (e.g., reconciliation with known financial calculations) for each candidate output of the plurality of candidate outputs. In certain embodiments, the auxiliary domain module 305 may update the scoring of the large language model 301 based on predetermined weights and/or metadata associated with the unstructured data logs to provide an optimized scoring accuracy for the plurality of candidate outputs. In step 306, the enterprise system 100 may calculate an average score of the plurality of candidate outputs and each candidate output is compared to the calculated average, where the calculated average may refer to the predetermined threshold. In step 308, the enterprise system 100 may update a plurality of parameters associated with the large language model 301 via selective reinforcement, where the one or more candidate outputs that exceed the predetermined threshold are utilized to update the plurality of parameters associated with the large language model 301. In certain embodiments, the updating of the plurality of parameters of the large language model 301 may improve subsequent outputs for future generations of collected data associated with the enterprise system 100.

Figure 4:
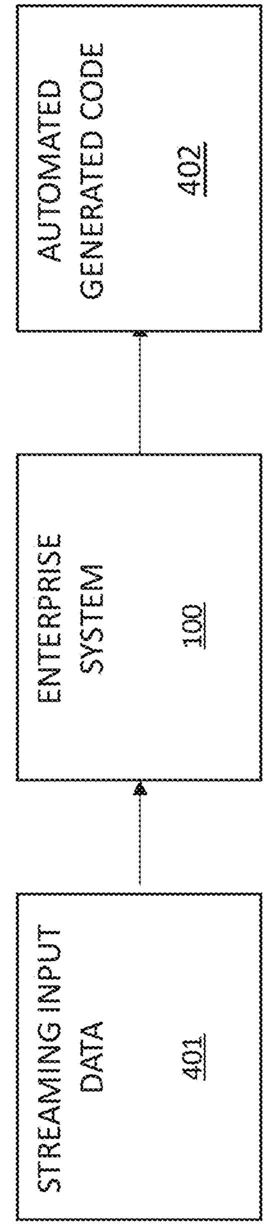
FIG. 4 depicts a schematic of real-time re-training of the enterprise system using additional data, in accordance with one or more embodiments of the present disclosure.

FIG. 4 depicts a schematic 400 of real-time re-training of the enterprise system 100 using additional data, in accordance with one or more embodiments of the present disclosure.

In some embodiments, the enterprise system 100 may be re-trained using streaming input data 401 by dynamically constructing a plurality of smart prompts in near real-time, where the streaming input data 401 may refer to a plurality of new events (e.g., trades, positions, and/or corporate actions). In some embodiments, the enterprise system 100 may reperform the flowchart of FIG. 2 and FIG. 3 on a rolling and/or scheduled basis to ensure that enterprise system 100 remains up to date, where this rolling and/or scheduled basis may refer to a continual adaption of the enterprise system 100 to optimize the group relative policy. In some embodiments, the enterprise system 100 may automatically generate code 402 associated with the plurality of selected candidate outputs based on generated logic and/or code snippets that can be compiled directly into production frameworks and enable optimal reconfiguration and/or modernization. In certain embodiments, the automated generated code 402 may allow for faster maintenance and onboarding of the enterprise system 100 to reduce overhead of deciphering legacy business logic. In certain embodiments, the automated generated code 402 may increase the accuracy of the plurality of candidate outputs based on log-driven outputs that match validated, real-world results. In certain embodiments, the automated generated code 402 may incorporate additional data sources (e.g., regulatory updates) to continuously evolve, thereby making the enterprise system 100 more extensible. In certain embodiments, the automated generated code 402 may be more resilient that the input data 401 based on the generation of the candidate solutions, where the enterprise system 100 is robust against individual model errors.

Figure 5:
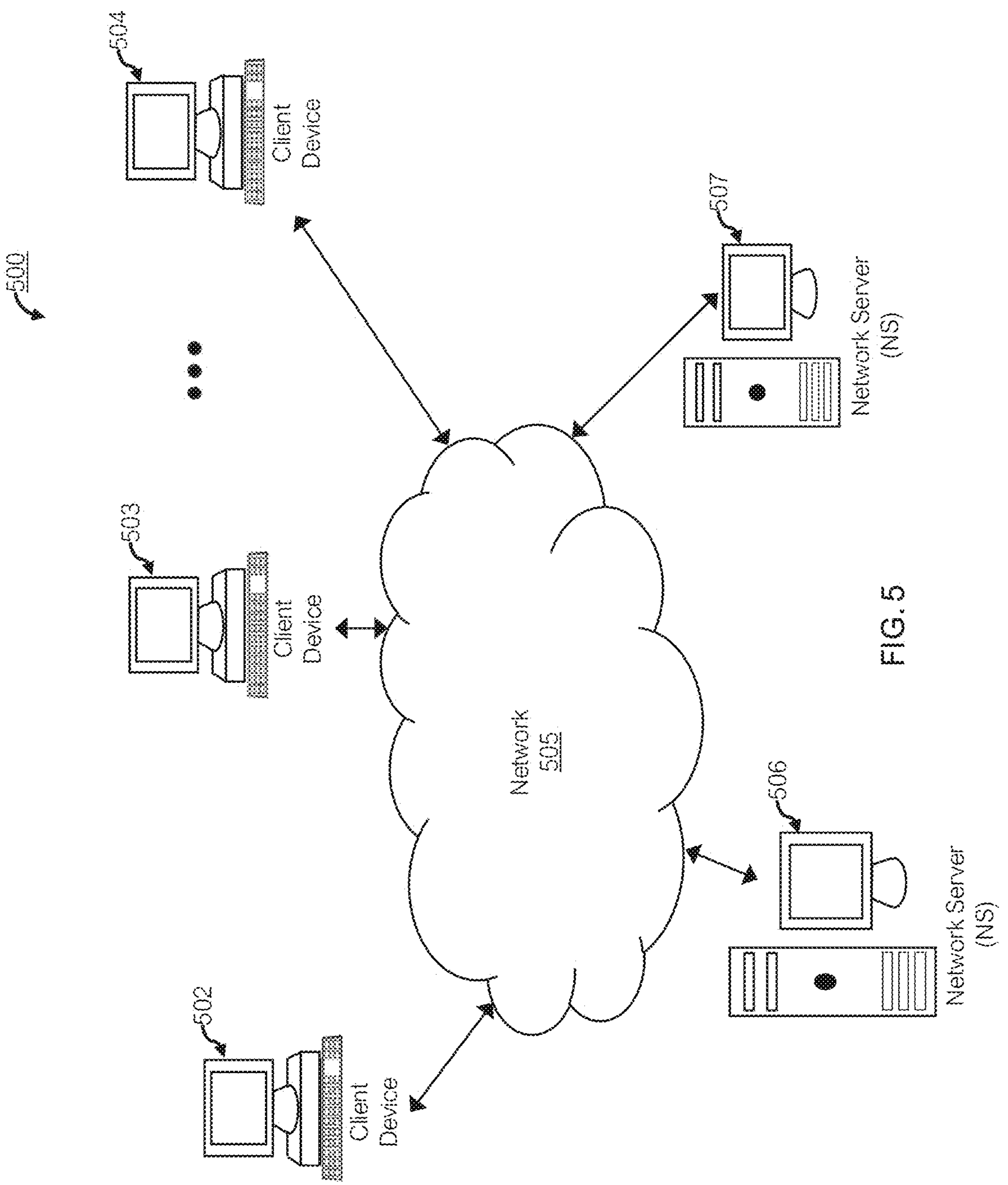
FIG. 5 depicts a block diagram of exemplary computer-based system/platform in accordance with one or more embodiments of the present disclosure.

FIG. 5 depicts a block diagram of an exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 500 may be configured to automatically generating code to update a plurality of parameters associated with the large language model 301 based on one or more selected candidate outputs, as detailed herein.

In some embodiments, the exemplary computer-based system/platform 500 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 500 may be configured to remotely execute the instructions associated with the exemplary enterprise system 100 of the present disclosure, automatically utilizing at least one machine-learning model described herein.

In some embodiments, referring to FIG. 5, members 502-504 (e.g., clients) of the exemplary computer-based system/platform 500 may include virtually any computing device capable of utilizing the exemplary enterprise system 100 to automatically generate code for one or financial services by utilizing a data ingestion module configured to collect structured and unstructured data from financial systems via a network (e.g., cloud network), such as network 505, to and from another computing device, such as servers 506 and 507, each other, and the like. In some embodiments, the member devices 502-504 may be smart phones, personal computers, multiprocessor systems, microprocessor-based or programmable consumer electronics, network PCs, and the like. In some embodiments, one or more member devices within member devices 502-504 may include computing devices that connect using a wireless communications medium such as smart phones, radio frequency (RF) devices, infrared (IR) devices, CBs, integrated devices combining one or more of the preceding devices, or virtually any mobile computing device, and the like. In some embodiments, one or more member devices within member devices 502-504 may be devices that are capable of connecting using a wired or wireless communication medium such as a laptop, tablet, desktop computer, a netbook, a smart phone, an ultra-mobile personal computer (UMPC), and/or any other device that is equipped to communicate over a wired and/or wireless communication medium. In some embodiments, one or more member devices within member devices 502-504 may include may launch one or more applications. In some embodiments, one or more member devices within member devices 502-504 may be configured to receive and to send web pages, and the like. In some embodiments, the exemplary enterprise system 100 of the present disclosure may be configured to automatically generate code based on one or more selected candidate outputs to update a plurality of parameters of a large language model 301. In some embodiments, a member device within member devices 502-504 may be specifically programmed by either Java, .Net, QT, C, C++ and/or other suitable programming language. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards. In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, at least one computer network communication over the exemplary network 505 may be transmitted based at least in part on one of more communication modes. In some embodiments, the exemplary network 505 may also include mass storage, such as network attached storage (NAS), a storage area network (SAN), a content delivery network (CDN) or other forms of computer or machine-readable media.

In some embodiments, the exemplary server 506 or the exemplary server 507 may be a web server (or a series of servers) running a network operating system. In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 501-504.

In some embodiments and, optionally, in combination of any embodiment described above or below, for example, one or more exemplary computing member devices 502-504, the exemplary server 506, and/or the exemplary server 507 may include a specifically programmed software module that may be configured to automatically generate code based on one or more selected candidate outputs to update a plurality of parameters of a large language model 301.

Figure 6:
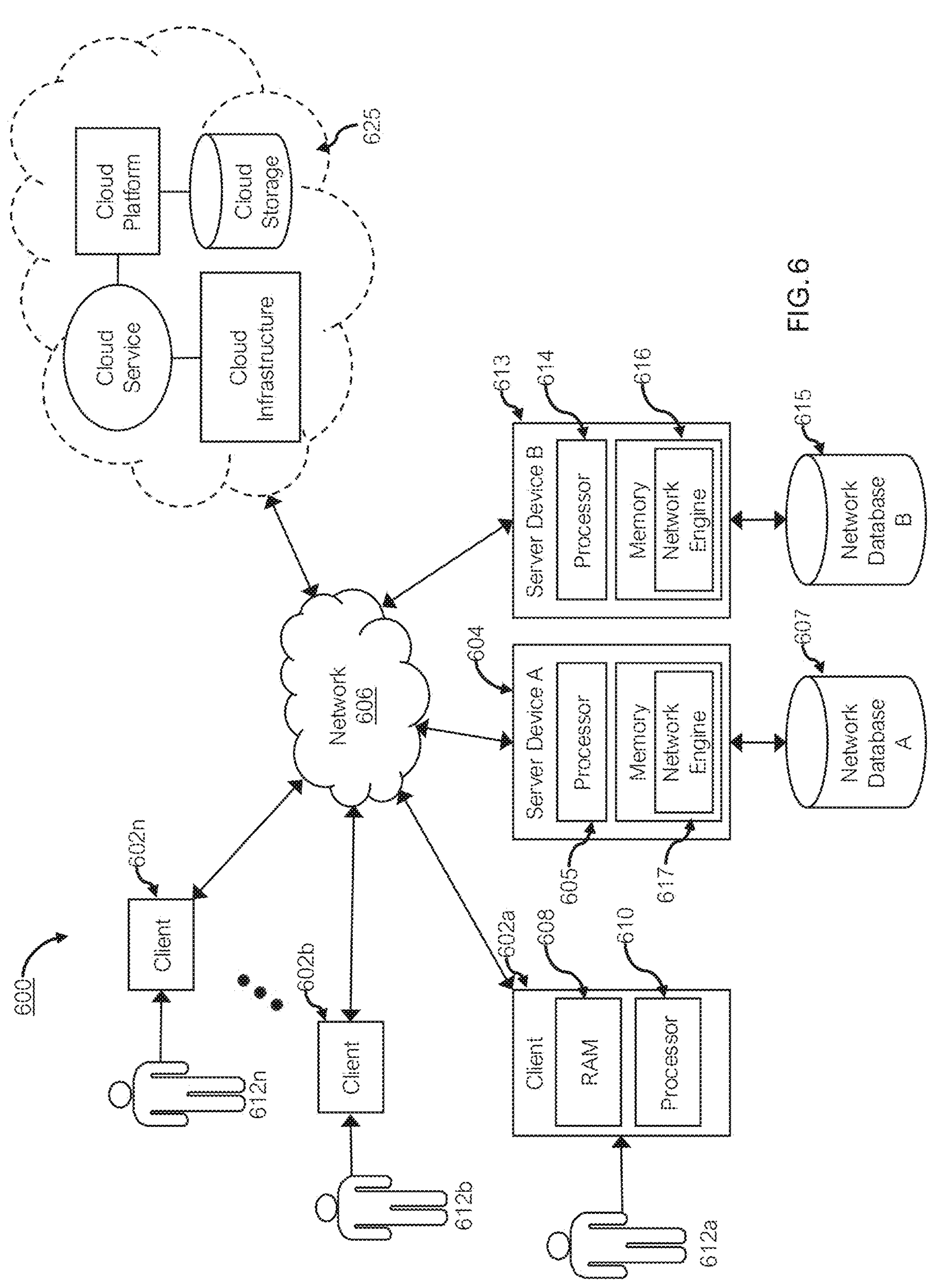
FIG. 6 depicts a block diagram of another exemplary computer-based system/platform in accordance with one or more embodiments of the present disclosure.

FIG. 6 depicts a block diagram of another exemplary computer-based system/platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 602*a*, 602*b* thru 602*n* shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602*a*, with computer-readable instructions. Also, various other forms of computer-readable media may transmit or carry instructions to a computer, including a router, private or public network, or other transmission device or channel, both wired and wireless.

In some embodiments, member computing devices 602*a* through 602*n* may also comprise a number of external or internal devices. In some embodiments, examples of member computing devices 602*a* through 602*n* (e.g., clients) may be any type of processor-based platforms that are connected to a network 606 such as, without limitation, personal computers, smart phones, digital tablets, laptop computers, Internet appliances, and other processor-based devices. In some embodiments, member computing devices 602*a* through 602*n* may be specifically programmed with one or more application programs in accordance with one or more principles/methodologies detailed herein. In some embodiments, member computing devices 602*a* through 602*n* shown may include, for example, personal computers executing a browser application program. In some embodiments, through the member computing client devices 602*a* through 602*n*, users, 612*a* through 612*n*, may communicate over the exemplary network 606 with each other and/or with other systems and/or devices coupled to the network 606. As shown in FIG. 6, exemplary server devices 604 and 613 may be also coupled to the network 606. Exemplary server device 604 may include a processor 605 coupled to a memory that stores a network engine 617. Exemplary server device 613 may include a processor 614 coupled to a memory 616 that stores a network engine. In some embodiments, one or more member computing devices 602*a* through 602*n* may be mobile clients. As shown in FIG. 6, the network 606 may be coupled to a cloud computing/architecture(s) 625. The cloud computing/architecture(s) 625 may include a cloud service coupled to a cloud infrastructure and a cloud platform, where the cloud platform may be coupled to a cloud storage.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
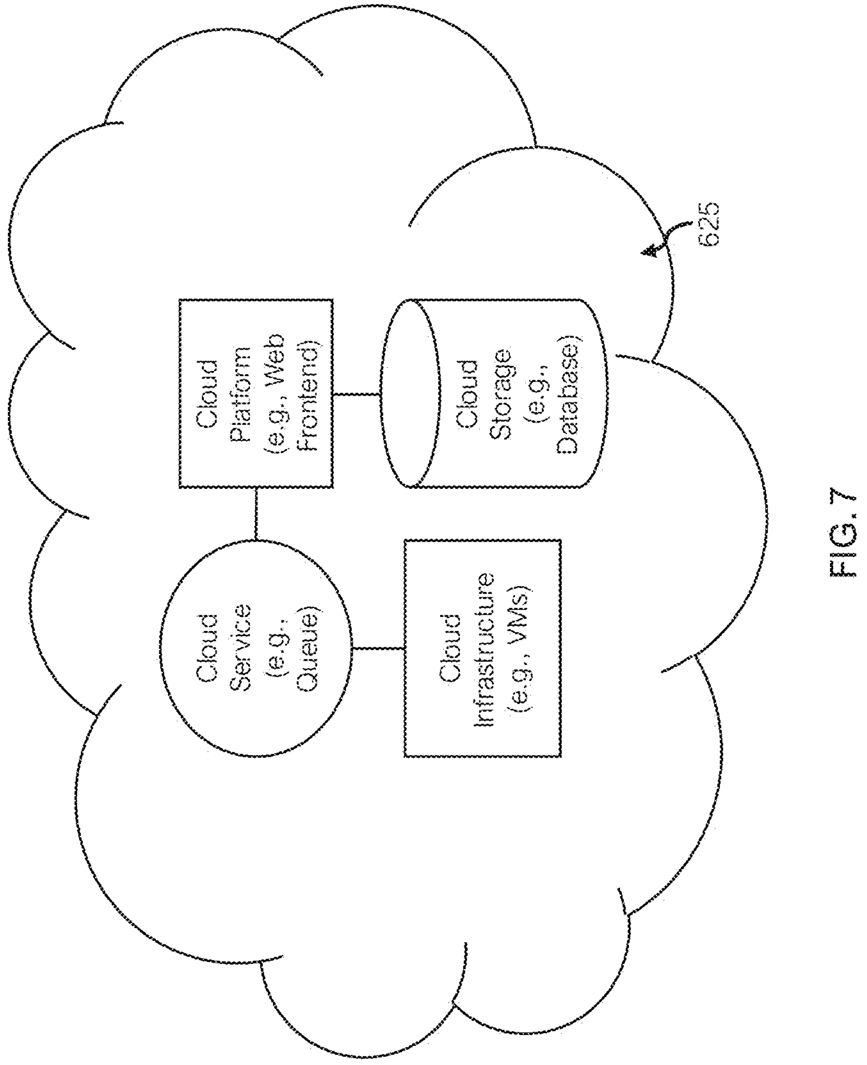
FIGS. 7 and 8 are diagrams illustrating implementations of cloud computing architecture/aspects with respect to which the disclosed technology may be specifically configured to operate, in accordance with one or more embodiments of the present disclosure.
Figure 8:
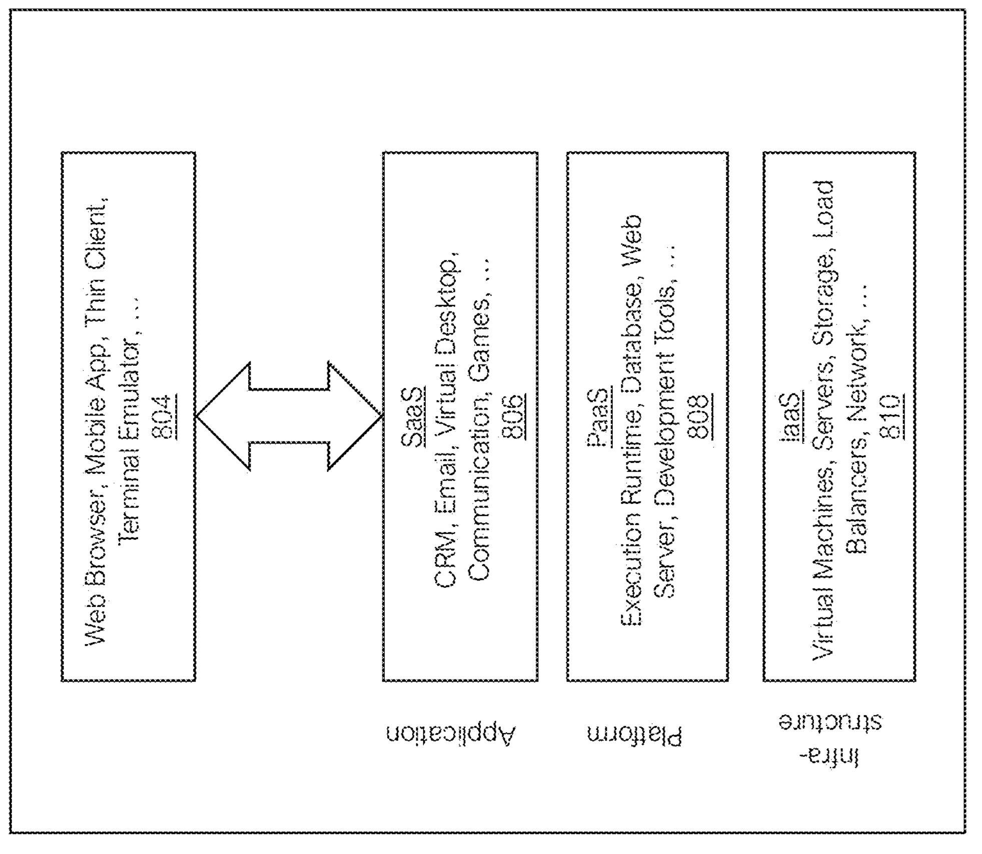

FIG. 7 and FIG. 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 7 illustrates an expanded view of the cloud computing/architecture(s) 625 found in FIG. 6. FIG. 8. illustrates the exemplary inventive computer-based components of the present disclosure may be specifically configured to operate in the cloud computing/architecture 625 as a source database 804, where the source database 804 may be a web browser. a mobile application, a thin client, and a terminal emulator. In FIG. 8, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS) 810, platform as a service (PaaS) 808, and/or software as a service (SaaS) 806.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages.

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

As used herein, the term "mobile electronic device," or the like, may refer to any portable electronic device that may or may not be enabled with location tracking functionality. For example, a mobile electronic device can include, but is not limited to, a mobile phone, Personal Digital Assistant (PDA), or any other reasonable mobile electronic device.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-implemented method comprising:

integrating, by a processor, received structured data and received unstructured data from at least one enterprise system for a plurality of data outputs;

generating, by the processor, one or more smart prompts based on an alignment of one or more data outputs of the plurality of data outputs;

retrieving, by the processor, documentation relevant to a particular workflow and appending the particular workflow to the one or more smart prompts;

utilizing, by the processor, a large language model to produce a plurality of candidate outputs based on the one or more smart prompts;

scoring, by the processor, each candidate output of the plurality of candidate outputs using a language model scoring function and at least one domain-specific scoring function, wherein the domain-specific scoring function provides additional weighted values to one or more candidate outputs;

calculating, by the processor, an average score across the plurality of candidate outputs;

selecting, by the processor, at least one candidate output that exceeds a predetermined threshold, the predetermined threshold associated with the average score across the plurality of candidate outputs; and updating, by the processor, a plurality of parameters associated with the large language model based on the at least one selected candidate output.

2. The computer-implemented method of claim 1, wherein the structured data comprises transaction data and the unstructured data comprises associated data logs from at least one mainframe system.

3. The computer-implemented method of claim 1, wherein generating the one or more smart prompts comprises aligning transaction data outputs associated with a production of the data outputs.

4. The computer-implemented method of claim 1, wherein retrieving documentation relevant to the particular workflow comprises extracting predetermined passages from system manuals, regulatory guidelines, and architectural documentation.

5. The computer-implemented method of claim 1, wherein the large language model is trained using group relative policy optimization.

6. The computer-implemented method of claim 1, wherein scoring each candidate output comprises applying a domain-specific validation algorithm to generate numeric scores quantifying compliance with predetermined domain criteria.

7. The computer-implemented method of claim 1, wherein the domain-specific scoring function compares candidate outputs against known regulatory constraints and historical transaction records.

8. The computer-implemented method of claim 1, wherein updating the plurality of parameters associated with the large language model comprises selective reinforcement based on candidate outputs that exceed the predetermined threshold.

9. The computer-implemented method of claim 1, further comprising automatically generating code associated with the at least one selected candidate output.

10. The computer-implemented method of claim 1, wherein the method is performed in real-time using streaming input data to dynamically construct smart prompts.

11. The computer-implemented method of claim 1, further comprising parsing identified processing steps to generate structured data pairs representing temporal or logical relationships between the identified processing steps.

12. The computer-implemented method of claim 1, further comprising storing final outputs with associated log references establishing traceability to source data.

13. The computer-implemented method of claim 1, wherein the method further comprises utilizing auxiliary domain-specific scoring algorithms to fine-tune or train the large language model in a continual manner.

14. The computer-implemented method of claim 1, wherein the method further comprises communicating with a plurality of models and modules to automatically generate code associated with the plurality of candidate outputs.

15. The computer-implemented method of claim 1, wherein the method further comprises receiving real-time streaming data associated with financial events, wherein newly received data triggers repeated execution of one or more workflows.

16. A system comprising: one or more processors; and a memory in communication with the one or more processors and storing instructions that, when executed by the one or more processors, cause the one or more processors to:

integrate received structured data and received unstructured data from at least one enterprise system for a plurality of data outputs;

generate one or more smart prompts based on an alignment of one or more data outputs of the plurality of data outputs;

retrieve documentation relevant to a particular workflow and appending the particular workflow to the one or more smart prompts;

utilize a large language model to produce a plurality of candidate outputs based on the one or more smart prompts;

score each candidate output of the plurality of candidate outputs using a language model scoring function and at least one domain-specific scoring function, wherein the domain-specific scoring function provides additional weighted values to one or more candidate outputs;

calculate an average score across the plurality of candidate outputs;

select at least one candidate output that exceeds a predetermined threshold, the predetermined threshold associated with the average score across the plurality of candidate outputs; and update a plurality of parameters associated with the large language model based on the at least one selected candidate output.

17. The system of claim 16, wherein the structured data comprises transaction data and the unstructured data comprises associated data logs from at least one mainframe system.

18. The system of claim 16, wherein the large language model is trained using group relative policy optimization.

19. The system of claim 16, wherein the domain-specific scoring function compares candidate outputs against known regulatory constraints and historical transaction records.

20. A computer-implemented method comprising:

integrating, by a processor, received structured data and received unstructured data from at least one enterprise system for a plurality of data outputs;

generating, by the processor, one or more smart prompts based on an alignment of one or more data outputs of the plurality of data outputs;

retrieving, by the processor, documentation relevant to a particular workflow and appending the particular workflow to the one or more smart prompts;

utilizing, by the processor, a large language model to produce a plurality of candidate outputs based on the one or more smart prompts;

scoring, by the processor, each candidate output of the plurality of candidate outputs using a language model scoring function and at least one domain-specific scoring function, wherein the domain-specific scoring function provides additional weighted values to one or more candidate outputs;

calculating, by the processor, an average score across the plurality of candidate outputs;

selecting, by the processor, at least one candidate output that exceeds a predetermined threshold, the predetermined threshold associated with the average score across the plurality of candidate outputs;

automatically generating, by the processor, code associated with the at least one selected candidate output; and updating, by the processor, a plurality of parameters associated with the large language model based on the at least one selected candidate output.

* * * * *